United States Patent [19]

Buxbaum

[11] Patent Number: 5,288,792

[45] Date of Patent: Feb. 22, 1994

[54] ADDITIVE FOR FRICTION LINING MIXTURES

[75] Inventor: Lothar Buxbaum, Landskron, Austria

[73] Assignee: Chemson Polymer-Additive Gesellschaft, Arnoldstein, Austria

[21] Appl. No.: 823,222

[22] Filed: Jan. 21, 1992

[30] Foreign Application Priority Data

Jan. 28, 1990 [AT] Austria .................. 178/91

[51] Int. Cl.$^5$ .......................... C10M 125/00
[52] U.S. Cl. ........................ 252/25; 252/29; 252/30
[58] Field of Search .................. 252/25, 29, 30

[56] References Cited

U.S. PATENT DOCUMENTS

| 4,181,524 | 1/1980 | Bucher et al. | 75/123 G |
| 4,255,321 | 3/1981 | Brassen | 524/420 |
| 4,970,049 | 11/1990 | Baker et al. | 419/11 |
| 4,978,499 | 12/1990 | Pierson et al. | 420/87 |
| 5,041,158 | 8/1991 | Larson | 75/231 |

*Primary Examiner*—Jacqueline V. Howard
*Attorney, Agent, or Firm*—Seidel, Gonda, Lavorgna & Monaco

[57] ABSTRACT

A solid lubricant additive for resin-bound friction lining mixtures contains manganous sulphide (MnS). The additive further optionally contains other sulphides, carbon carriers such as graphite and coke, phosphates and/or oxides. The additive results in the adjustment of the coefficient of friction and wear in friction lining materials. The additive may be advantageously employed in asbestos-free and lead-free friction lining mixtures in heavy-duty friction parts as used in brakes, clutches, synchromesh gears.

26 Claims, No Drawings

ADDITIVE FOR FRICTION LINING MIXTURES

The present invention relates to an additive for friction lining mixtures with which the coefficient of friction and wear can be concertedly adjusted. This additive may be advantageously employed in asbestos-free and lead-free friction lining mixtures in heavy-duty friction parts as used in brakes, clutches, synchromesh gears, etc.

Generally, the friction materials in automobile industry must have the following properties:

The coefficient-of-friction must be adapted to the special task and be stable over a wide range of speeds and temperatures, independently of the shape and age of the material. It is of particular importance that in the cold, the coefficient-of-friction recovers approximately its initial value even after extreme temperature stress. For disk brake linings, this value should be higher than 0.35. The friction material must show only little wear, but on the other hand it must not severely attack the brake disk. In order to ensure good comfort properties, no noise must occur, and the sensitivity to moisture must be as low as possible. Moreover, such friction linings must be industrially producible at reasonable costs.

It is extremly difficult to satisfy all requirements for a friction material. For this reason, various friction material systems have been developed, each of which being optimally suited for its particular field of application.

Friction linings of pure carbon (often carbon fiber reinforced) are simple in their composition and are frequently employed for airplane brakes. First attempts to use this system for disk brakes in passenger cars are promising.

Ceramic friction linings have been known for quite some time, but have so far not become generally accepted. According to recent work in this field, it seems possible to employ ceramic-based friction linings in passenger cars on the long run.

Sintered metals are a further basis for friction materials. Various types of brake and clutch linings are produced on this basis; various additives known from the field of metal deformation have proven effective as adjuvants.

The least costly way of producing friction materials is production on the basis of synthetic resins. At present, the majority of linings for passenger cars and trucks is produced on the basis of synthetic resins. The synthetic resins employed are mainly resins on the basis of phenol and cresol, which may be modified with thermoplasts or rubber depending on the application. However, in order to adapt the synthetic resins to the various requirements in practice, quite a number of inorganic additives like metals, mineral fibers and various other inorganic filling materials and additives must be added.

Among the materials having reinforcing and filling effects, asbestos is hardly used any more, but rather inorganic or organic fibers as e.g. carbon or aramide fibers or metals in the form of powders, chips or fibers. Various mineral fibers and various forms of mica find application as well. Barium sulphate or various types of alumina are mainly used as the filler material.

The coefficient-of-friction-active filler materials serve to influence the value of the coefficient-of-friction, to ensure that this coefficient-of-friction remains largely unchanged at various temperatures and to prevent the friction lining and the counter material from wearing off quickly. Moreover, they are to have a positive effect on the development of noise in the course of braking events.

In this context, reference is being made to "Friction Materials", Chemical Technology Review No. 100 Noyes Data Corporation, USA 1978, as relevant state of the art and as relevant disclosure.

One of the most important lubricant/slip additives employed in practice is lead sulphide (PbS). Although PbS is presently used in many—even asbestos-free—linings, new developments attempt to replace lead sulphide by other lubricant/slip additives.

Another problem not solved by lead sulphide is the requirement that the coefficient-of-friction be largely constant at increasing temperatures (no fading) and, in connection with this, that the coefficient-of-friction recovers its initial level after temperature stress as completely as possible (recovery).

Deposits on the brake disk must not form, and at the same time wear of the brake disk shall not become too high. Here, incorporating manganese in the metal surface of the disk seems to play a role as well.

Accordingly, the object of the present invention is an additive for resin-bound friction lining mixtures, characterized in that it consists totally or partly of manganous sulphide (MnS).

Particularly, it does not contain any lead compound as a functional additive. The manganous sulphide occurs as a mineral, but may also be produced synthetically. The manganous sulphide is preferably and most easily produced by precipitation from manganese-containing solutions with hydrogen sulphide, sodium sulphide or the like. Normally the first product of such a precipitation is an instable pink modification of manganous sulphide. By known modifications of the precipitation parameters, e.g. precipitation from ammoniaceous solution, the stable green modification may be obtained immediately.

Depending on the basic formulation of the friction lining, manganous sulphide may be used either alone or together with solid lubricants and other functional friction additives, also as premix with them. Other sulphides, carbon carriers like graphite and coke, phosphates and various oxides are suitable for doing so. If necessary, soft metals may be employed as well.

Advantageously usable sulphides are the sulphides of molybdenum, zinc, antimony, copper, iron, tungsten, niobium, titanium. Among the oxides, the oxides of aluminum, iron, chrome, copper, zinc, manganese, antimony, titanium, molybdenum, silicon, zirconium are preferably used for adjusting the desired coefficient-of-friction.

Among the phosphates, the phosphates of magnesium, calcium, boron, aluminum, copper, iron, zinc, which are insoluble or hardly soluble, are preferably used.

In the following examples it is not only shown that asbestos-free brake linings having very good utilization properties can be produced with manganous sulphide, but also linings which are certainly equal, maybe even superior, to linings containing lead sulphide:

EXAMPLES

Testing of the additives according to the invention takes place with complete brake linings in order to establish conditions as close to practice as possible.

A. Preparation of the Linings

The raw materials are mixed in a Lödige batch mixer FM 50 for 17 minutes. Balanced portions of this mixture in accordance with the size of the lining are filled into the compaction mold of a Leinweber brake-lining laboratory press and compacted there at a temperature of around 150° C. In doing so, the lining mass is pressed against the iron back plate previously inserted into the mold and at the same time adhered to it.

After cooling of the linings, they are surface ground with a cylinder head grinder in order to ensure full contact with the brake disk during testing. The raw linings thus prepared are cured in a Heraeus circulating-air drying oven at temperatures of up to 280° C.

B. Testing of the Linings

Testing is done with a Krauss coefficient-of-friction testing stand RWS 75, the coefficient-of-friction and wear behaviour of the linings and of the brake disk being tested.

Good contact between the brake lining surface and brake disk is ensured by a running-in phase with 100 braking events of 5 seconds each. The following tests are carried out at the basic temperatures of 100° C., 200° C., 300° C. and 400° C. At first, the basic temperature is achieved by applying the brake and, departing from this, braking is done for 5 seconds and the brake disk is cooled down again until the respective basic temperature is restored. This cycle is carried out 200 times successively for each basic temperature. After these 200 braking events each, the brake linings are removed and weight loss is determined for the linings as well as for the disk. From this, wear can be calculated. Application pressure of the brake linings is 10 N/cm$^2$, and the electrical energy uptake measured in the course of braking forms the basis for calculating the coefficient-of-friction. The evaluation unit of the coefficient-of-friction testing stand is designed so that the coefficient-of-friction may be recorded by means of a recorder. From this, fading, the difference in coefficient-of-friction between 100° and 400° C., and recovery, the difference between the final 100° C. coefficient-of-friction value and the respective initial 100° C. value is determined as well.

The values for wear of lining are the average of the values for both individual linings used in one brake.

EXAMPLE 1

The following raw materials are mixed as described above, the mixture is compacted and the linings are ground, cured, and tested.

|  | % w/w |
|---|---|
| rock wool | 8 |
| polyarylamide | 2 |
| glass fiber | 7 |
| steel wool | 8 |
| brass chips | 5 |
| phenolic resin | 12 |
| rubber flour | 4 |
| baryte | 14 |
| Ca(OH)$_2$ | 5 |
| iron oxide | 5 |
| Al$_2$O$_3$ | 6 |
| CaSiO$_3$ | 3 |
| graphite | 6 |
| oil coke (petroleum coke) | 5 |
| MnS | 10 |

The following results were obtained:
Total wear of the lining: 24.5 g
Total wear of the disk: 21.4 g
Fading ($\mu$ 100°–400° C.): 0.01
Recovery ($\mu$ 100° C. before-after): 0.00

It can be seen that the braking effect (characterized by the coeffient-of-friction) remains completely unchanged before and after a temperature stress of more than 400° (normal in downhill driving) and there is merely a minimum reduction of the efficacy of the brake even at such high temperatures.

EXAMPLE 2

Procedure is as in example 1, but 10% PbS are used instead of MnS.

The following results are obtained with the friction linings thus prepared:
Total wear of the lining: 24.0 g
Total wear of the disk: 29.2 g
Fading: 0.14
Recovery:

Here, a significant decrease of braking efficacy may in effect be observed. Disk wear is also higher than when using MnS.

EXAMPLES 3–7

Procedure is as in example 1, but instead of the 10% MnS used there, the following combinations are employed:

| Example | 3 | 4 | 5 | 6 | 7 |
|---|---|---|---|---|---|
| MnS % | 7 | 7 | 7 | 7 | 7 |
| Sb$_2$S$_3$ % | 3 | — | — | — | — |
| MnO$_2$ % | — | — | 3 | — | — |
| MoS$_2$ % | — | — | — | 3 | — |
| ZnS % | — | 3 | — | — | 4 |
| Ca$_3$(PO$_4$)$_2$ | — | — | — | — | 4 |
| Wear of the lining (g) | 23.3 | 24.5 | 17.9 | 21.4 | 23.5 |
| Wear of the disk (g) | 25.6 | 14.6 | 13.7 | 18.5 | 19.2 |
| Fading | 0.10 | 0.08 | 0.05 | 0.03 | 0.05 |
| Recovery | 0.07 | 0.05 | 0.08 | 0.05 | 0.04 |

(Example 7 includes no oil coke)

EXAMPLE 8

Procedure was as in example 1, except for the fact that the pink modification of MnS was employed instead of the green modification. Basically identical (within the measuring fault range) results were obtained.

Total wear of the lining: 24.2
Total wear of the disk: 20.5
Fading ($\mu$ 100° C.–400° C.): 0.02
Recovery ($\mu$ 100° C. before-after): 0.01.

I claim:

1. A resin bound friction lining mixture which comprises a phenolic and/or cresolic resin and a solid lubricant additive comprising MnS.

2. Friction lining mixture according to claim 1, wherein the additive further comprises one or more sulphides selected from the group consisting of sulphides of molybdenum, zinc, antimony, copper, iron, tungsten, titanium, and combinations thereof.

3. Friction lining mixture according to claim 1 wherein the additive further comprises one or more oxides selected from the group consisting of oxides of aluminum, iron, chromium, copper, zinc, manganese, antimony, titanium, molybdenum, silicon, zirconium and combinations thereof.

4. Friction lining mixture according to claim 2 wherein the additive further comprises one or more oxides selected from the group consisting of oxides of aluminum, iron, chromium, copper, zinc, manganese, antimony, titanium, molybdenum, silicon, zirconium, and combinations thereof.

5. Friction lining mixture according to claim 1 wherein the additive further comprises graphite, coke, or a combination thereof.

6. Friction lining mixture according to claim 2 wherein the additive further comprises graphite, zoke, or a combination thereof.

7. Friction lining mixture according to claim 3 wherein the additive further comprises graphite, coke, or a combination thereof.

8. Friction lining mixture according to claim 4 wherein the additive further comprises graphite, coke, or a combination thereof.

9. Friction lining mixture according to claim 1 wherein the additive further comprises a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

10. Friction lining mixture according to claim 2 wherein the additive further comprises a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

11. Friction lining mixture according to claim 3 wherein the additive further comprises a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

12. Friction lining mixture according to claim 8 wherein the additive further comprises a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

13. Friction lining mixture according to claim 5 wherein the additive further comprises a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

14. Friction lining mixture according to claim 2 wherein the additive comprises
from 20 to 80% w/w MnS; and
from 20 to 80% w/w of another sulphide selected from the group consisting of $MoS_2$, ZnS, $FeS_2$, and combinations thereof.

15. Friction lining mixture according to claim 4 wherein the additive comprises
from 20 to 80% w/w MnS;
from 0 to 50% w/w of another sulphide selected from the group consisting of $MoS_2$, ZnS, $FeS_2$, and combinations thereof; and
from 5 to 20% w/w of an oxide selected from the group consisting of $Al_2O_3$, CuO, $Fe_2O_3$, $MnO_2$, and combinations thereof.

16. Friction lining mixture according to claim 8 wherein the additive comprises
from 20 to 70% w/w MnS;
from 0 to 50% w/w of a sulphide selected from the group of sulphides consisting of $MoS_2$, ZnS, $FeS_2$ and combinations thereof;
from 5 to 20% w/w of an oxide selected from the group of oxides consisting of $Al_2O_3$, CuO, $Fe_2O_3$ $MnO_2$, and combinations thereof; and
from 10 to 40% w/w of graphite, coke, or combinations thereof.

17. Friction lining mixture according to claim 12 wherein the additive comprises
from 20 to 70% w/w MnS;
from 10 to 40% w/w of a sulphide selected from the group of $MoS_2$, ZnS, $FeS_2$, and combinations thereof;
from 5 to 20% w/w of an oxide selected from the group consisting of $Al_2O_3$, CuO, $Fe_2O_3$, $MnO_2$ and combinations thereof;
from 10 to 40% w/w of graphite, coke or combination thereof; and
from 10 to 30% w/w of tricalcium phosphate, zinc sulphate, Madrell's salt or combinations thereof.

18. Friction lining mixture according to claim 1 comprising MnS in the green form.

19. Solid lubricant additive comprising
MnS;
one or more sulphides selected from the group consisting of sulphides of molybdenum, zinc, antimony, copper, iron, tungsten, titanium, and combinations thereof;
one or more oxides selected from the group consisting of oxides of aluminum, iron, chromium, copper, zinc, manganese, antimony, titanium, molybdenum, silicon, zirconium, and combinations thereof; and
a phosphate, pyrophosphate or polyphosphate selected from the group consisting of phosphates, pyrophosphates and polyphosphates of sodium, potassium, magnesium, calcium, boron, aluminum, copper, zinc, iron and combinations thereof.

20. Solid lubricant additive comprising
MnS;
one or more oxides selected from the group consisting of oxides of aluminum, iron, chromium, copper, zinc, manganese, antimony, titanium, molybdenum, silicon, zirconium and combinations thereof; and
graphite, coke, or a combination thereof.

21. Solid lubricant additive according to claim 19 further comprising graphite, coke, or a combination thereof.

22. Solid lubricant additive comprising
MnS; and
a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

23. Solid lubricant additive according to claim 22 further comprising one or more sulphides selected from the group consisting of sulphides of molybdenum, zinc, antimony, copper, iron, tungsten, titanium, and combinations thereof.

24. Solid lubricant additive according to claim 20 further comprising a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

25. Solid lubricant additive according to claim 20 further comprising one or more sulphides selected from the group consisting of sulphides of molybdenum, zinc, antimony, copper, iron, tungsten, titanium, and combinations thereof; and a phosphate, pyrophosphate or polyphosphate selected from the group consisting of phosphates, pyrophosphates and polyphosphates of sodium, potassium, magnesium, calcium, boron, aluminum, copper, zinc, iron, and combinations thereof.

26. Solid lubricant additive according to claim 22 further comprising graphite, coke, or a combination thereof.

* * * * *